Apr. 3, 1923. 1,450,552
F. JOMBART
PRODUCTION OF HOLLOW METAL CASTINGS
Filed Mar. 23, 1921 2 sheets-sheet 1
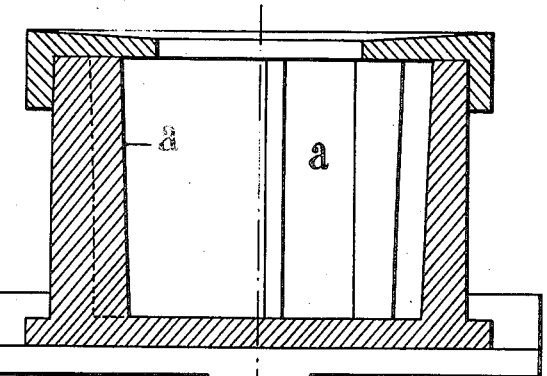
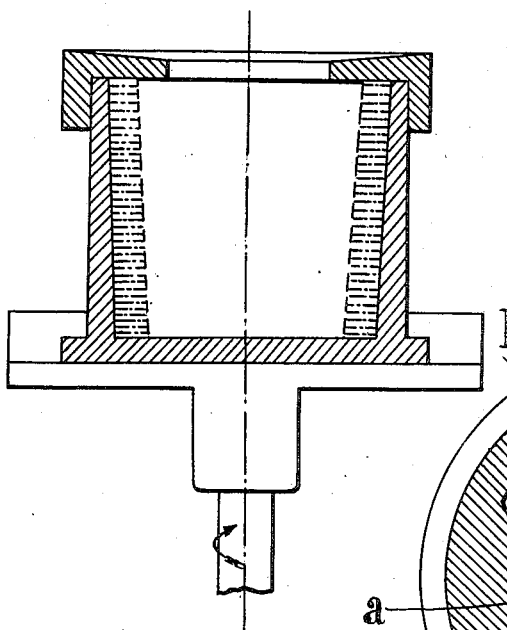
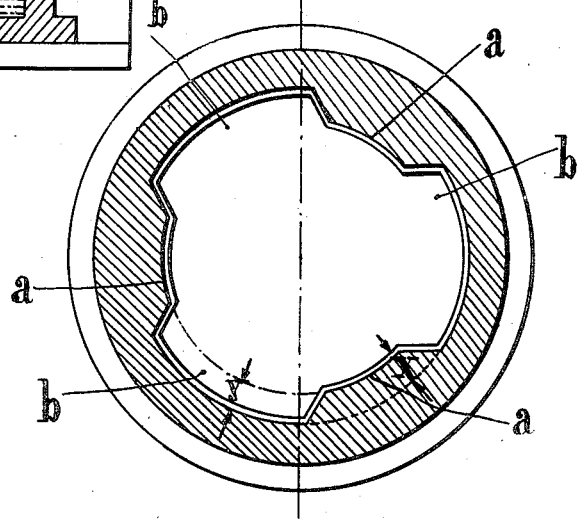
INVENTOR
Félix Jombart
BY
ATTORNEY Apr. 3, 1923. 1,450,552
F. JOMBART
PRODUCTION OF HOLLOW METAL CASTINGS
Filed Mar. 23, 1921  2 sheets-sheet 2

INVENTOR
Félix Jombart
BY
ATTORNEY

Patented Apr. 3, 1923.

1,450,552

UNITED STATES PATENT OFFICE.

FÉLIX JOMBART, OF PARIS, FRANCE, ASSIGNOR TO LA SOCIÉTÉ D'ETUDES ET DE CONSTRUCTIONS METALLURGIQUES, OF PARIS, FRANCE.

PRODUCTION OF HOLLOW METAL CASTINGS.

Application filed March 23, 1921. Serial No. 454,834.

*To all whom it may concern:*

Be it known that I, FÉLIX JOMBART, a citizen of the Republic of France, and resident at Paris, 64 Rue de la Boetie, France, have invented a new and useful Production of Hollow Metal Castings (for which I have filed application in France on Aug. 9, 1918, Patent No. 491,212, and application of addition filed Jan. 20, 1920), which process is fully set forth in the following specification.

The present invention relates to a process for the production of solid or hollow bodies of various forms.

It is known that hollow bodies may be obtained by pouring the molten material into moulds which are rotated until solidification takes place.

The interior form of the bodies thus obtained is a rotation paraboloid, and, given a sufficient rotational speed and by covering the mould with an annular lid, tubular bodies may be produced (see French Patent No. 493,449, dated 23rd June, 1916, for "Process for the manufacture of hollow bodies").

The object of the present invention is the application of the process mentioned in the foregoing French patent to the production of solid or hollow bodies of widely differing shapes. In order to do this, certain improved structural features, depending as to their precise form on the nature of the products to be manufactured, are incorporated in the mould in which the casting is effected.

In the accompanying drawing:

Figure 1 is a central vertical section of a centrifugal casting apparatus for producing a tubular ingot.

Fig. 2 is a similar view of a modified form of casting apparatus involved in the present invention.

Fig. 3 is a sectional plan view of Fig. 2.

Figure 4:
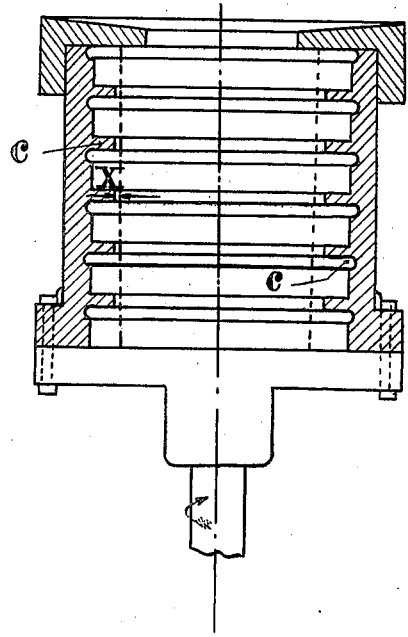
Figs. 4 and 5 are, respectively, a central vertical section and a sectional plan view of a further form of the invention.

If a hollow ingot of tubular form (Fig. 1) is obtained by centrifugal casting, this ingot may be sawed or cut along planes intersecting the axis, so as to transform it into a certain number of curved plates. These several curved plates may be flattened by passing them under a hammer, or through a press or rolling mill and thus produce any form of body that could have been obtained from an ordinary ingot. The present process however, affords the following advantages:

(1) The pipe of the ingot is eliminated.
(2) The work of forging is considerably reduced.

As regards rolling especially, the slabs furnished direct by the process obviate the necessity of passing the ingots through blooming rolls. Moreover, the formation of curved plates can be facilitated as shown in Figs. 2 and 3, by providing moulds with a certain number of longitudinal projections $a$ on their inner surface (in the examples shown in the drawings the casting mould has three longitudinal projections $a$).

These projections $a$ are of a thickness $x$ at least equal to the thickness $y$ of the hollow body to be produced. On being taken out of the mould a number of curved plates are thus obtained which are identical one with another, provided the precaution has been taken to pour the metal before the mould has attained its full speed, so that equal amounts of metal have been fed to the different compartments $b$ of the mould.

To facilitate the removal of the curved plates from the mould the partitions may be shaped so as to have a profile such as shown in Fig. 3.

If the plates are to be rolled, it is sufficient to calculate the internal taper of the mould and the running speed so that the metal will have the same section in the upper and lower portions of the mould, this being necessary in order that slabs which are quite rectangular and of uniform thickness may be produced by the first pass through the rolling mill.

Figure 5:
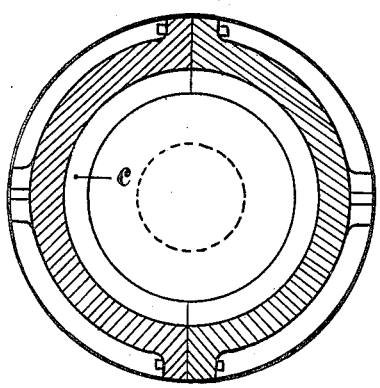

Instead of providing longitudinal compartments as above described inside the mould, compartments may be formed by means of planes at right angles to the axis of rotation. Suppose, in the first place—as is shown in Figs. 4 and 5—that the mould instead of being tapered inside is of some other sectional shape, corrugated for instance. To obtain this result, it is sufficient, as will be seen, to construct the mould in two parts connected together by bolts, collars, bars or any other means.

If the moulded body is to have, as assumed, a corrugated shape, a few saw cuts will give, in a very simple manner, the same result as would be obtained in a much more complicated manner by casting in several moulds, and by this process the preparation of the several moulds, and the waste incidental thereto and to the formation of the castings, due to the production of imperfect moulds and castings, are avoided.

In order to render the sawing operations as easy as possible the mould may be provided with horizontal partitions $c$ which would reduce to a very small thickness the metal intervening between one corrugation or rib and the next. This arrangement is represented in Fig. 4.

It will be seen that it is also possible to combine the two kinds of partitions which have been described in the same mould, for various applications.

It is finally possible to pour several metal or different alloys into the same mould. In this case the separating surface of the two bodies is a rotation paraboloid of the same perimeter as the free surface. The hollow bodies obtained under these conditions by centrifugal casting can be converted into tubes by drawing processes. The use of two metals or alloys in one mould thus enables tubes to be made consisting of two different metals on the inside and outside, which may be of importance in a great many commercial uses. Thus, for instance, steel may be used to impart mechanical strength to a tube and the alloy coating it internally may impart, for example, a chemical resistance to acids, which may be desired in the industries using said acids.

If two metals for example are cast in a mould having longitudinal partitions, bimetallic sheets may be obtained by rolling, or bimetallic objects by forging, which products may offer various advantages.

Figure 6:
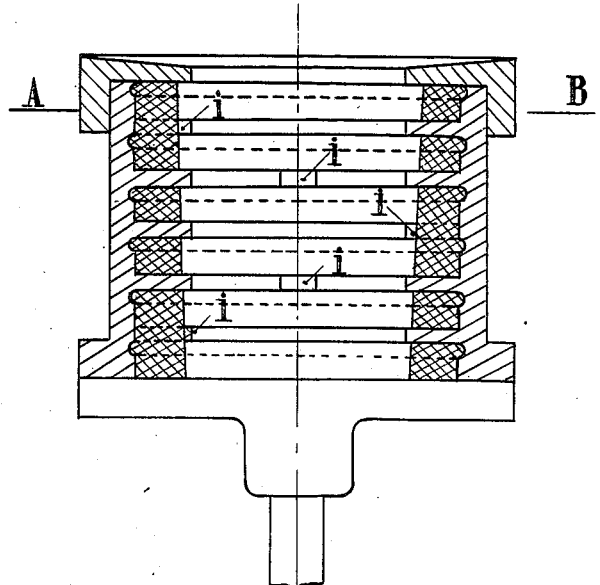
Figs. 6 and 7 are corresponding views of a still further embodiment.
Figure 7:
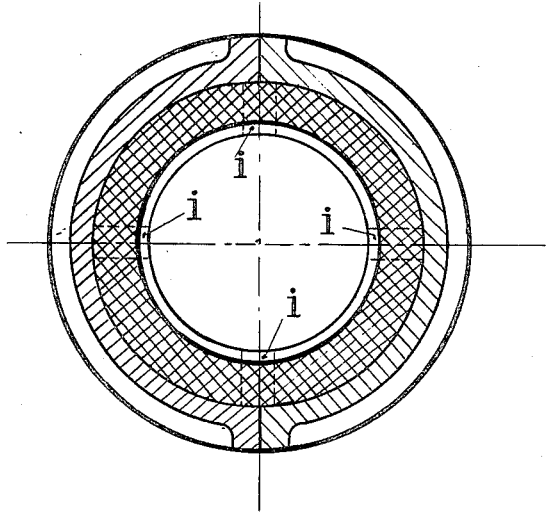

Figs. 6 and 7 of the drawing illustrate a modified form of the mould, wherein the continuous horizontal partitions are replaced by partitions which are interrupted at one or several places, so that the latter partitions may protrude either as far as, or beyond, the free surface of the poured metal; the single interstices $i$, of the partitions serve for metal feeding from one step to the upper next step.

The various interstices in the partitions may either aline with one another from the lower part of the mould to the upper part of the latter, or may be disposed at any suitable points, according as may be desired.

When the casting is removed from the mould, its component members will be found to be joined together at a few points only, which permits them to be readily separated from one another merely by breaking the joints.

Another advantage of the non-continuous horizontal partitions consists in permitting the metal to flow up to the upper compartment as soon as the pouring operation begins; whereas, when the horizontal partitions are made continuous, the metal cannot feed to an upper step, unless the steps immediately below were fed flush with their separating partitions.

From the foregoing, it will be understood that the provision of the continuous partitions insures a greater homogeneity in the construction of the various parts of the mould, since each of these parts is fed by degree from the beginning to the end of the pouring.

What has just been said about the horizontally disposed partitions, is of course to be applied, in the same conditions, to oblique partitions.

What I claim is:

1. A substantially-cylindrical, hollow mould for casting hollow metal articles by centrifugal force, mounted to rotate about a vertical axis and having the inner moulding surface of its vertical wall divided into a plurality of separate compartments into which the molten metal is forced by centrifugal action.

2. A substantially-cylindrical, hollow mould for casting hollow metal articles by centrifugal force, mounted to rotate about a vertical axis and having the inner moulding surface of its vertical wall provided with a plurality of partitions arranged in spaced, parallel relation to form separate compartments into which the molten metal is forced by centrifugal action.

3. A mould for casting hollow metal articles by centrifugal force, mounted to rotate about a vertical axis and having its vertical inner surface provided with a plurality of continuous, horizontal, annular partitions arranged in spaced, parallel relation to form separate, horizontal, annular compartments into which the molten metal is forced by centrifugal action; said partitions being provided with interstices to enable the molten metal to flow from a compartment to the next higher one as soon as the pouring operation begins, substantially as described.

4. A process of casting hollow metal objects by centrifugal force, which consists in pouring the molten metal into a vertically disposed substantially-cylindrical, rotating hollow mould having its vertical interior moulding surface provided with a plurality of annular partitions arranged in spaced, parallel relation to form separate compartments for the reception of the molten metal, thereby to produce a casting comprising a plurality of similar members connected together at a few points only by easily-severable joints.

5. A process of casting hollow metal objects by centrifugal force, which consists in pouring the molten metal into a vertically-disposed rotating mould having its vertical interior moulding surface provided with a plurality of continuous, horizontal, annular partitions arranged in spaced, parallel relation to form separate, horizontal, annular compartments for the reception of the molten metal, thereby to produce a casting comprising a plurality of similar members connected together at a few points only by easily-severable joints; said partitions having interstices to enable the centrifugal action to feed the metal from a compartment to the next higher one as soon as the pouring operation begins.

6. A process of casting hollow metal objects by centrifugal force, which consists in pouring the molten metal into a mould rotating about a vertical axis and having its vertical interior moulding surface divided into a plurality of horizontal, annular compartments to receive the metal, said compartments having connecting passages from one to another to enable the centrifugal action to feed the metal through said passages from a compartment to the next higher one as soon as the pouring operation begins.

In testimony whereof I have signed this specification in the presence of two subscribing witnesses.

FÉLIX JOMBART.

Witnesses:
FERNAND DUFOUR,
CHARLES LEOI LOISEL.